United States Patent [19]

Bogenschutz et al.

[11] 4,060,152

[45] Nov. 29, 1977

[54] RAIL CAR BRAKE APPARATUS

[75] Inventors: Thomas M. Bogenschutz, Clayton; Thomas H. Engle, Cape Vincent; Eugene D. McEathron, Watertown, all of N.Y.

[73] Assignee: General Signal Corporation, Rochester, N.Y.

[21] Appl. No.: 680,952

[22] Filed: Apr. 28, 1976

Related U.S. Application Data

[63] Continuation of Ser. No. 590,168, June 25, 1975.

[51] Int. Cl.² .................................................. B61H 13/24
[52] U.S. Cl. ....................................... 188/52; 188/107
[58] Field of Search .................... 188/52, 107, 153 R, 188/196 D, 205

[56] References Cited

U.S. PATENT DOCUMENTS

| | | | |
|---|---|---|---|
| 3,378,108 | 4/1968 | McClure et al. | 188/107 X |
| 3,744,596 | 7/1973 | Sander | 188/203 |
| 3,780,837 | 12/1973 | Haydu | 188/52X |

Primary Examiner—Duane A. Reger
Attorney, Agent, or Firm—Pollock, Vande Sande & Priddy

[57] ABSTRACT

Rail car brake rigging of the type for use in a two-axle, four-wheel rail car truck is disclosed which embodies a double-acting brake cylinder and slack adjustor disposed transversely between the side frames of the car truck and connected to parallel brake beams disposed on opposite sides of the truck bolster, by a pair of spaced bell crank levers pivotably mounted on one of the beams, one arm of each bell crank lever being pivotably connected to the brake cylinder or its push rod, the other arm of each bell crank lever being pivotably connected to one of a pair of push rods joined to the other beam. The brake cylinder includes a parking brake actuating lever mounted to the housing thereof for manually, mechanically stroking the brake cylinder in the same manner as during fluid pressure actuated brake application, without inducing undesirable beam loadings and yet ensuring uniform application of the brakes at all wheels. The unique geometry of the invention permits the use of beams having small diameter tubular central sections to which cast brake heads may be easily attached by a circumferential weld. Spherical joints are disclosed for connecting each push rod at its opposite ends to a bell crank on one beam and to the remaining beam.

29 Claims, 11 Drawing Figures

RAIL CAR BRAKE APPARATUS

This is a continuation of application Ser. No. 590,168, filed June 25, 1975.

BACKGROUND OF THE INVENTION

Single cylinder truck-mounted brake systems for rail cars have been in use for some time with varying degrees of success. One such system is shown in U.S. Pat. No. 3,780,837 issued to Haydu.

While such prior art devices have achieved a measure of success, various problems and drawbacks have been noted. The brake beams of these systems are usually heavy section castings which include integral means for mounting brake shoes, brake cylinders, parking brake linkages and related equipment. The large size of these beams is made necessary by the location on the beams of the points at which the braking force is applied to the beams by the brake cylinder. Usually, the pivot points for the linkages interconnecting the parallel beams and the brake cylinder are located well inboard of the location at which braking force is transferred from the beam to the rail car wheels. This results in the generation of high bending moment stresses in the beams, which must be absorbed by heavy crossections. Clearly, the large beam size results in increased component weight and cost, plus reduced operating efficiency. Moreover, the use of integral brake heads requires beam removal should the brake heads become worn due to wear of the brake shoes.

Prior art systems have also been criticized because of the rather large amount of pressurized fluid required to stroke their long stroke actuators, especially those actuators having no provision for slack adjustment. Provision of long stroke capability is desirable to permit the use of thicker, longer lasting brake shoes. Where slack adjustment is provided, it frequently adjusts only for increases in brake shoe clearance due to wear but not for decreases due to shoe or wheel replacement.

Another drawback of prior art systems of this type has concerned the manual or parking brake system. Frequently, as in older parallel beam systems, the parking brakes are applied through a linkage mounted on one side of the truck, to provide clearance with the central portions of the truck and bolster. Due to the off-center mounting of the parking brake linkage, the brakes tend to be applied first on the side nearer the linkage mount and then, if at all, on the side further from the linkage mount. Due to the point of force application, high stresses are induced in the beams, which must be of a heavy crossection. The off-center mounting may result in application of insufficient braking force in cases where contact is made only on one side. Furthermore, crewmen checking a car to ensure parking brake application may mistakenly conclude that the brake has not been applied after looking at the shoes and wheels on the side opposite the linkage mount.

OBJECTS OF THE INVENTION

An object of the invention is to provide a parallel beam brake rigging having light-weight tubular brake beams and unique actuating and connecting linkages which minimize bending moments in the beams.

Another object of the invention is to provide for such a brake rigging a fluid pressure actuated brake cylinder having a mechanical slack adjuster which automatically adjusts the clearance between the brake shoe and wheel to provide a constant clearance prior to each brake application, irrespective of brake shoe or wheel wear or replacement of brake shoes or wheels.

A further object of the invention is to provide an actuator for such a brake rigging which is mounted to one of the beams itself and includes means for manually stroking the actuator to apply parking brakes just as during normal application, whereby uniform parking brake application is achieved at all wheels on both sides of the rail car truck.

Still another object of the invention is to provide a parking brake actuable by cable from a remote location to provide uniform parking brake application at all wheels.

Another object of the invention is to provide a brake beam with a light-weight central section to which are attached replaceable brake heads.

Yet another object of the invention is to provide a simple spherical joint for connecting push rods to brake beams.

The above objects of the invention are intended to be only exemplary; thus, other advantages achieved and problems solved by the disclosed invention may be apparent to those skilled in the art; however, the scope of the invention is to be limited only by the appended claims.

SUMMARY OF THE INVENTION

The above objects and other advantages are achieved by the invention which comprises in one of its embodiments a cylinder housing having a bore therein with a piston slidably mounted in the bore for alternate movement in a force applying and force releasing direction. A push rod is also slidably mounted within the bore for transmitting force applied to the piston in the force applying direction. An axially extending bore located in the push rod houses a lead screw which is mounted for rotation therein. Connected to the piston and the push rod are means for preventing movement of the push rod beyond a preselected distance in the force releasing direction in response to release of force acting on the piston. Means are also provided for preventing rotation of the lead screw into the push rod in the force applying direction unless the piston has moved a distance less than the preselected distance and simultaneously the push rod has transmitted a predetermined force in the force applying direction. When these conditions are met, rotation of the lead screw into the push rod is permitted in the force applying direction. Means are also provided for preventing rotation of the lead screw in the force applying direction after the piston has moved a distance equal to or greater than the preselected distance and, finally, for withdrawing the lead screw from the push rod in the force releasing direction when the withdrawing means has stopped further movement of the push rod in the force releasing direction and the piston has not yet completed its motion in the force releasing direction.

The brake rigging according to the invention is especially suited for use in a four-wheel type of vehicle truck having a transverse axis, a longitudinal axis perpendicular to the transverse axis and a bolster disposed so that its axis coincides with the transverse axis of the truck. The brake rigging includes two brake beams which extend in spaced, substantially parallel relation to the transverse axis of the truck and are guidably supported on the truck for bodily movement longitudinally thereof. One of the brake beams comprises a tubular central section to which are mounted a pair of brake shoe carrying heads, each of which includes an integral pivot means. A pair of bell crank levers are pivoted on these pivot means for rotation thereabout. The other brake beam also includes a tubular central section and a second pair of brake shoe carrying heads attached thereto. A pair of push rods are connected between the bell cranks on one beam and the brake shoe carrying heads on the other beam. Finally, a fluid pressure operable, double-acting brake actuator is mounted to the remaining arms of the bell crank levers for producing the necessary brake actuating forces. Unique spherical joints for connecting the push rods to the bell cranks and the brake shoe heads on the opposite brake beam are also provided.

DETAILED DESCRIPTION OF THE PREFERRED EMBODIMENTS

Figure 1:
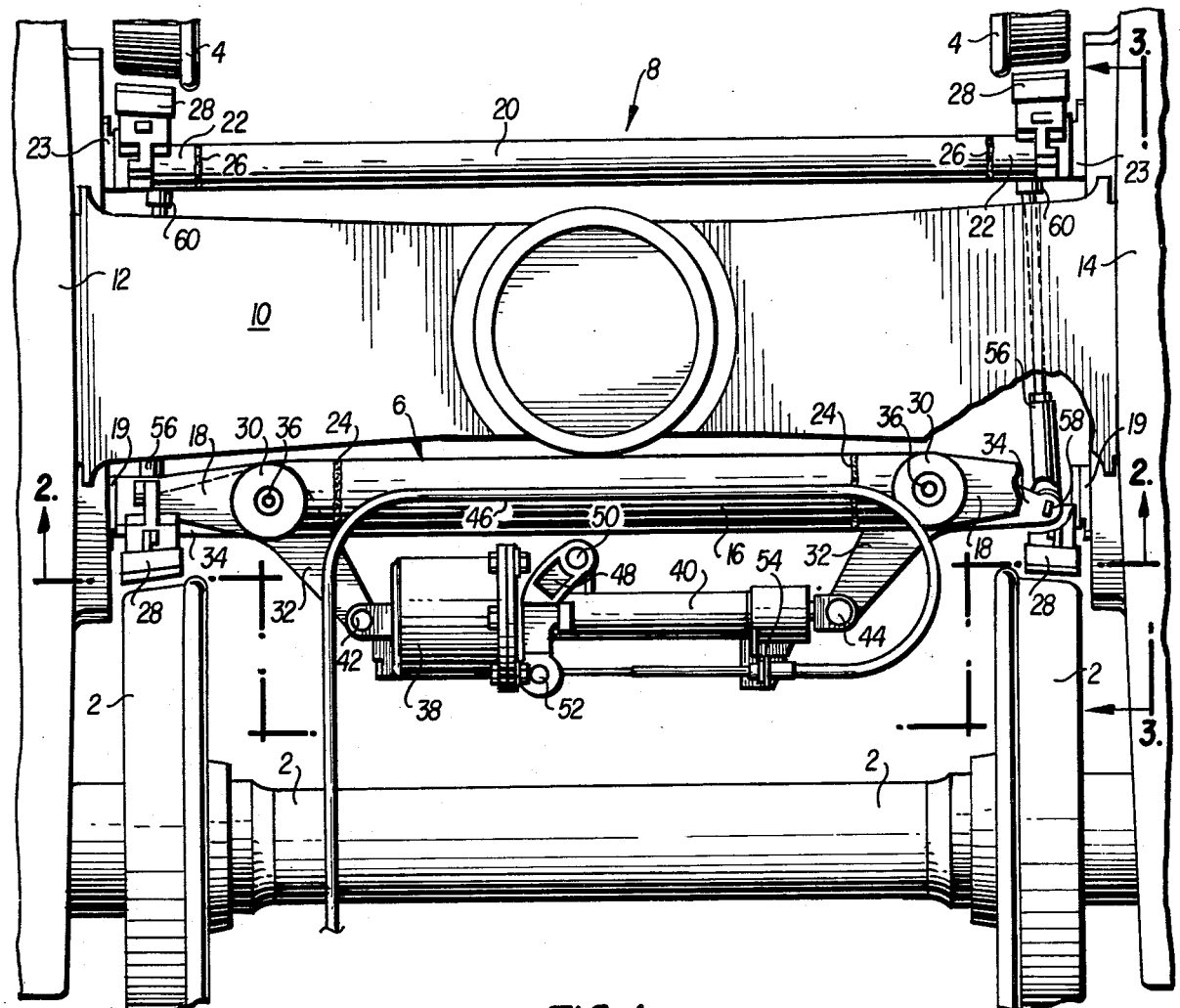
FIG. 1 shows a plan view of a parallel beam rail car brake apparatus according to the invention indicating the orientation of the various elements of the invention relative to the axles, wheels and bolster of a standard rail car.

There follows a detailed description of the preferred embodiments of the invention, reference being had to the accompanying drawings in which like reference numerals identify like elements of structure in each of the several Figures.

Figure 2:
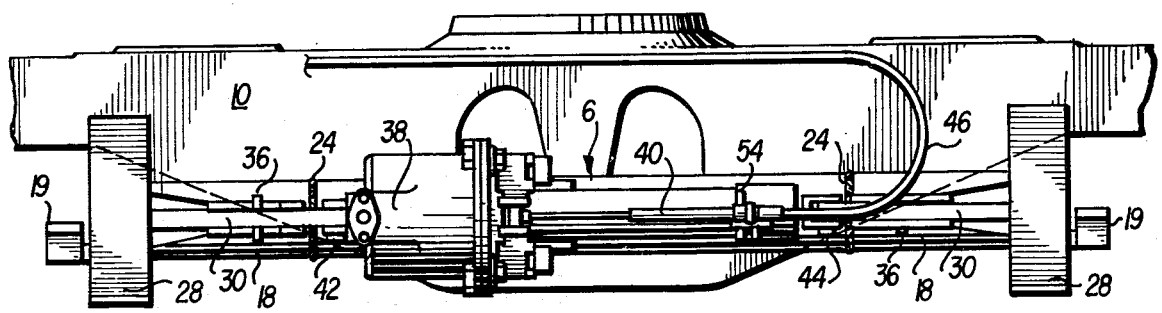
FIG. 2 shows a view taken along line 2—2 of FIG. 1.
Figure 3:
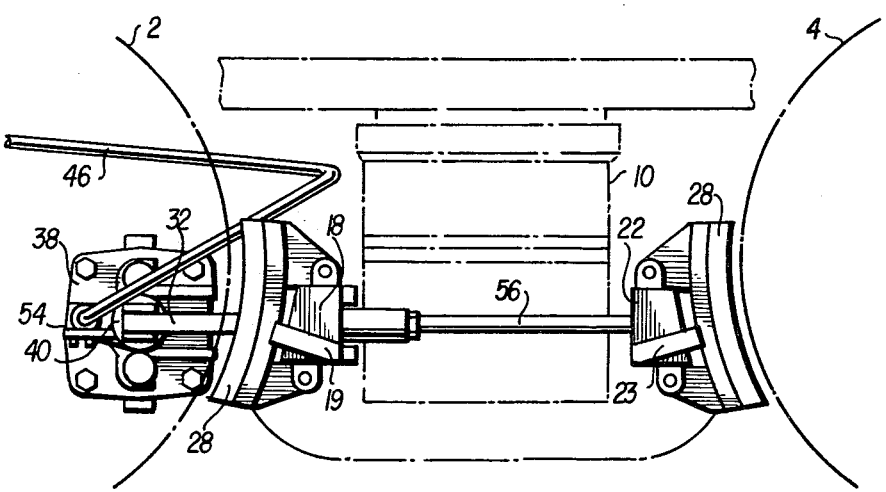
FIG. 3 shows a view taken along line 3—3 of FIG. 1.

With reference to FIGS. 1-3, the overall geometry and operation of the brake apparatus according to the invention may be understood. Conventional rail car wheel and axle assemblies 2 and 4 are partially illustrated. Located between and parallel with rail and axle assemblies 2 and 4 and on opposite sides of truck bolster 10 are a master beam 6 and a secondary beam 8. Beams 6 and 8 are movably mounted in conventional side frame members 12 and 14 in the usual manner, as will be more fully discussed hereafter. Master beam 6 comprises a central tubular portion 16 having a pair of cast brake heads 18 welded thereto at either end. Brake heads 18 include integral, outwardly projecting guide feet 19 which are sliably received in slots located in side frame members 12 and 14 in the usual manner, as will be appreciated by those skilled in the art. Secondary beam 8 comprises a central tubular portion 20 to which are welded cast brake heads 22. Brake heads 22 also include outwardly projecting guide feet 23 which are likewise slidably received in side frame members 12 and 14. Circumferential welds 24 and 26 join tubular portions 16 and 18 to cast brake head portions 20 and 22. Finally, conventional composition brake shoes 28 are attached to brake heads 18 and 22.

A pair of bell cranks 30 are pivotally mounted to brake heads 18 of master beam 6. Each bell crank 30 includes a braking force receiving arm 32 and a braking force transferring arm 34 mounted for unitary rotation about pivot 36. Arms 34 are sized to be as short as practical so that pivot point 36 may be located as close as possible to the outboard ends of master beam 6. This location of pivot points 36 ensures that the optimum force will be transferred from the actuator to brake heads on both beams, while a minimum amount of bending stress will be generated in master beam 6. The closer pivot points 36 are to the middle of master beam 6, the greater are the bending stresses in use and the heavier must be the tubular crossection.

A pneumatically driven brake cylinder 38, including a double-acting slack adjustor 40, is pivotally connected to arms 32 at pivots 42 and 44. Additional details of brake cylinder 38 and slack adjustor 40 will be discussed with regard to FIG. 9. An armored cable 46 is provided for manually actuating brake cylinder 38. To this end, a crank arm 48 is pivoted to the housing of slack adjustor 40 and brake cylinder 38 at pivot 50 and operatively connected to cable 46 at cable attachment point 52. A laterally extending bracket 54 attached to the housing of slack adjustor 40 secures the outer sheath of armored cable 46 to prevent its movement during manual actuation of the brakes. The other end of cable 46 (not shown) is attached to a conveniently located actuator (not shown).

Figure 4:
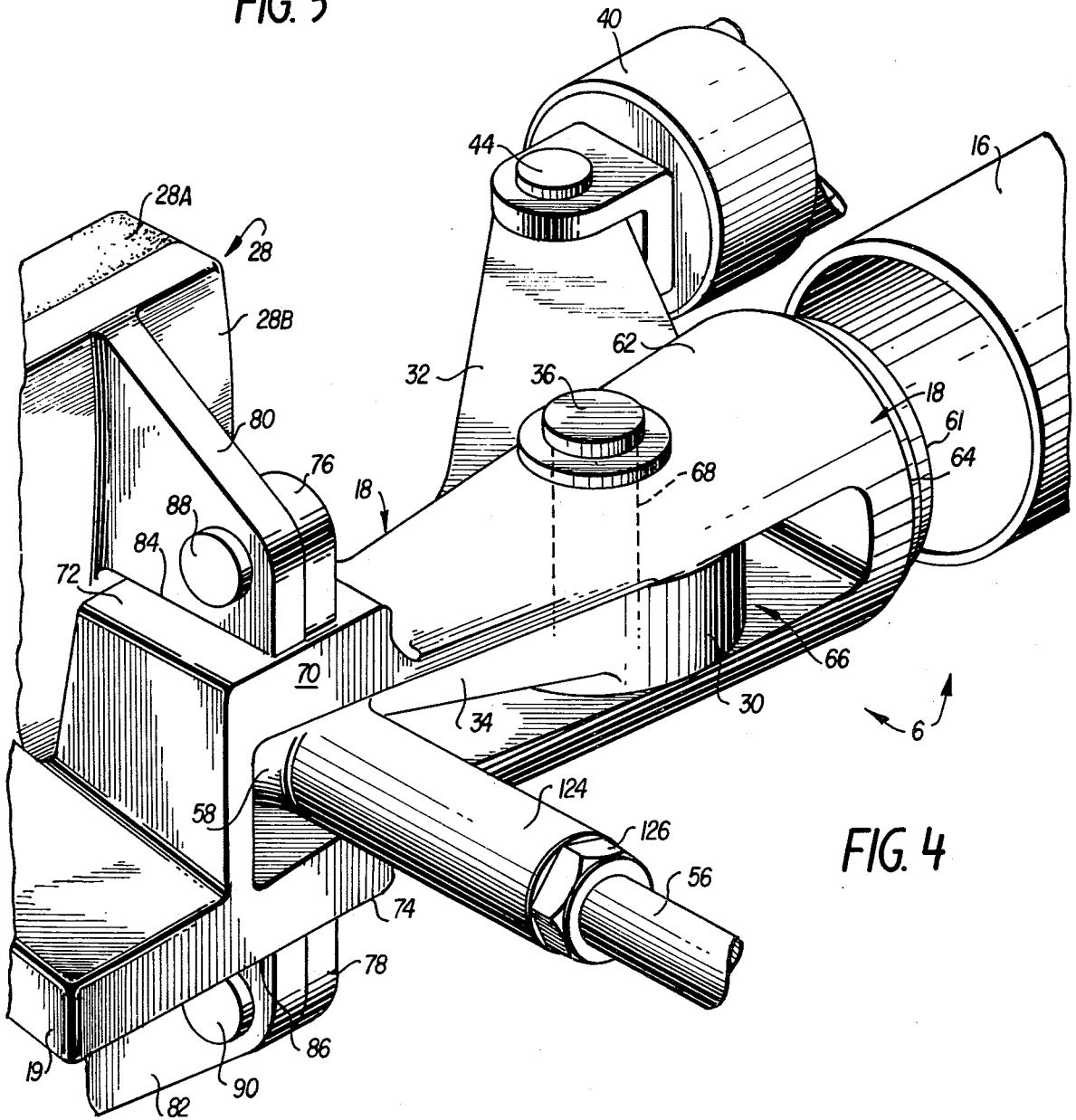
FIG. 4 shows a perspective view of one end of the primary brake beam according to the invention indicating the mode of attachment of the brake application bell cranks and the brake shoes.

A pair of push rods 56 are pivotally connected to arms 34 at spherical pivot joints 58, discussed in greater detail with respect to FIGS. 4 and 6. The opposite ends of push rods 56 are joined to secondary beam 8 at spherical pivot joints 60 located on brake heads 22, just inboard of brake heads 28, as discussed with respect to FIGS. 7 and 8. Pivot joints 60 are located so that when the brakes are actuated, push rods 56 will assume a position virtually perpendicular to both master beam 6 and secondary beam 8 to ensure transmission of optimum braking force to the rail car wheels. That is, spherical joint 58 is located slightly outboard of spherical joint 60 when the brakes are in their illustrated, retracted position so that as bell cranks 30 rotate, push rods 56 tend to move to a position perpendicular to brake beams 6 and 8.

During operation, pneumatic pressure is applied to brake cylinder 38, causing pivots 42 and 44 to move apart and rotate bell cranks 30 about pivots 36. As bell cranks 30 rotate, brake heads 28 mounted on secondary beam 8 will first move into contact with wheels 4, due to force transmitted by push rods 56. After contact is established at wheels 4, continued expansion of brake cylinder 38 will cause bell cranks 30 to pivot about spherical joints 58 and thus move brake heads 28 of master beam 6 into contact with wheels 2. Thus, the braking force is applied equally at all wheels at both ends of each braking beam. During manual application of the brakes, brake cylinder 38 functions identically so that equal braking force is applied at all wheels during manual brake application as well.

The unique geometry of the brake rigging permits substantial simplification of the brake beams. Because push rods 56 join secondary beam 8 at spherical joints 60 located just inboard of brake heads 28, very low bending stresses are induced during operation. Also, axial loading of the weld joint 26 is minimized. Thus, tubular section 20 may be quite small, such as three inch steel tubing. The design flexibility of a geometrically complex brake head is retained due to the use of cast brake heads, while final beam assembly is simplified due to the use of circumferential welds 26. Primary beam 6 is also greatly simplified compared to prior art cast beams; however, the location of pivot points 36 on the primary beam necessitates the use of a larger tubular section 16, which may be six to eight inch steel tubing. By making arms 34 as short as possible consistent with the required movement of the brake heads 28 and the stroke capabilities of the actuator, the bending stress in the primary beam may be minimized.

FIG. 4 shows a perspective view of cast brake head 18 and a portion of central tubular portion 16 of the primary brake beam 6. Brake head 18 comprises a unitary steel casting having a circular cylindrical inboard end portion 62 which includes a male weld preparation 64 adapted to mate with central tubular portion 16. See also FIG. 5. End portion 62 includes a longitudinal slot 66 located approximately mid-way in the body of portion 62. Bores 68 are located in portion 62 to receive pivots 36 on which bell cranks 30 are mounted. Slot 66 extends sufficiently toward the outboard end of brake head 18 to permit brake force application arm 34 to move therethrough to transfer brake application force to push rods 56.

At the outboard end of brake head 18, cylindrical inboard end portion 62 fares into an essentially rectangular block portion 70 which is integral with guide foot 19. A pair of substantially planar, parallel upper and lower surfaces 72, 74 are provided from which extend a pair 76, 78 of suitably apertured mounting flanges for attachment of brake shoe 28. As indicated, brake shoe 28 comprises a composition brake shoe 28A and a mounting bracket 28B. Extending from mounting bracket 28B are a pair of mounting flanges 80, 82 which include substantially planar stop surfaces 84, 86 which are situated to make contact with surfaces 72, 74 should brake shoe 28 move substantially relative to brake head 18 during braking. Suitable fasteners 88, 90, such as rivets or nuts and bolts, attach brake heads 28 to mounting flanges 76, 78.

Figure 5:
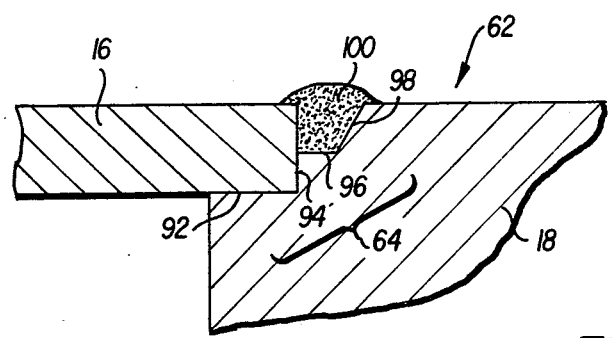
FIG. 5 shows a section view indicating the weld geometry for the joint between the tubular central portions of the brake beams according to the invention and the cast brake heads according to the invention.

FIG. 5 shows a section view of the weld joining tubular portion 16 to cylindrical portion 62 of brake head 18. As indicated, brake head 18 includes an axially extending, cylindrical male portion 92 having an outer diameter slightly smaller than the inner diameter of tubular portion 16. A radially oriented stop surface 94 extends outwardly from male portion 92 to limit the depth of penetration of portion 92 into tubular portion 16. Axially extending weld root portion 96 joins chamfered portion 98 which extends to the exterior of cylindrical portion 62 of brake head 18. The ability to use this type of weld geometry is an important feature of the invention. Because of low bending and axial stresses, the central portion of both the master and secondary beams may be a tubular section and the brake heads may be attached by a simple circumferential weld. The brake heads 18 and 22 are held against the tubular section on centers which correspond to the center line of the tubular section. The entire assembly is rotated or spun around this center while a simple welding head is used to deposit the necessary weld material to complete the joint. This provides a low cost assembly procedure and at the same time yields the strength of the steel tubular section of the beam without sacrificing any of the versatility of the cast brake head.

Figure 6A:
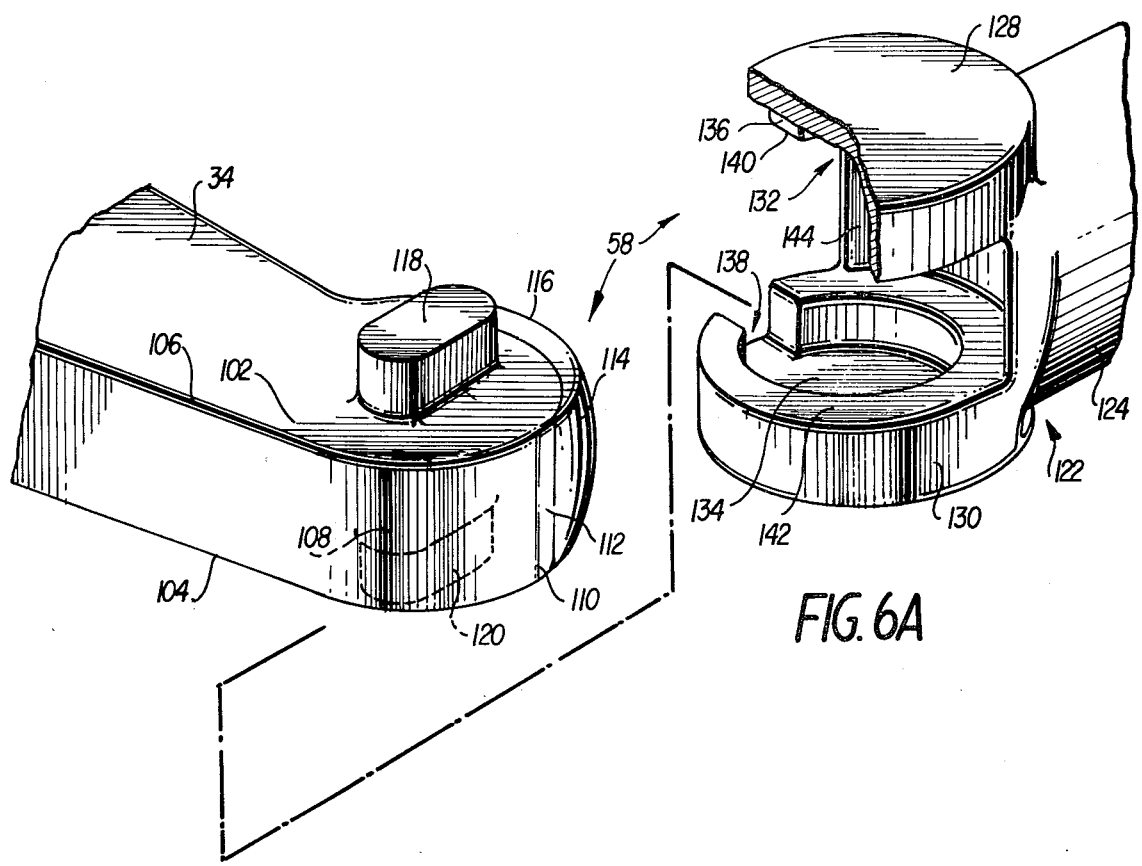
FIG. 6A shows an exploded view of the spherical joint used to connect the brake applying bell cranks to the push rod running between the brake beams.

FIG. 6A shows an exploded view of spherical joint 58 which connects push rods 56 to the brake force applying arms of bell cranks 30. Brake force transfer arm 34 includes at its outer end one-half of spherical pivot joint 58. A pair of spaced upper and lower, essentially parallel surfaces 102, 104 are bounded along the edge 106 facing toward the wheel and axle assembly 2 by an essentially perpendicular cylindrical surface 108 which extends approximately to the center of end 110 of arm 34. From end 110, a short planar segment 112 extends essentially on a tangent from surface 108 to merge with a spherical bearing surface 114 which extends between surfaces 102, 104 along the edge 116, facing toward secondary beam 8. An upwardly extending vertical boss 118 and downwardly extending vertical boss 120 (in phantom) are integrally formed on surfaces 102 and 104 on an axis containing the center of curvature of spherical surface 114. Bosses 118 and 120 are elongated across surfaces 102 and 104 and have their long axis oriented to face approximately along the axis of force transmission from arm 34 to push rod 56.

Push rod 56 includes at its primary beam end a yoke 122 which forms the other half of spherical joint 58. Yoke 122 comprises a cylindrical stem 124 having a threaded bore at one end for receiving push rod 56. See FIG. 4. A lock nut 126 secures push rod 56 within a threaded bore in stem 124. A pair of essentially parallel arms 128, 130 extend from stem 124 and are spaced from each other a distance slightly greater than the spacing between surfaces 102, 104 of arm 34. One sixteenth inch clearance is considered sufficient. Arms 128, 130 include a pair of opposed, interior counterbores 132, 134 which are sized to rotatably receive bosses 118, 120. A pair of radially extending slots 136, 138, sized to slidably receive bosses 118, 120, extend outwardly from interior counterbores 132, 134 to permit yoke 122 to receive bosses 118, 120 within counterbores 132, 134. Slots 136, 138 are oriented approximately transversely to the axis of push rods 56. The flat rims 140, 142 of counterbores 132, 134 are essentially parallel and spaced to provide adequate clearance with surfaces 104 and 106 of arm 34, as previously mentioned. The surface 144 on stem 124 between arms 128 and 130 is spherically shaped to accommodate surface 114 when joint 58 is assembled.

Figure 6B:
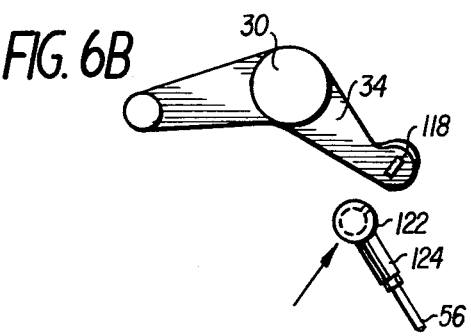
FIGS. 6B and 6C shows schematically the manner in which the spherical joint is assembled.
Figure 6C:
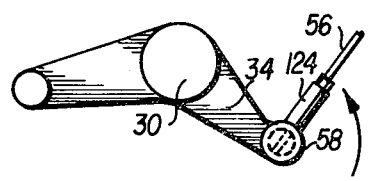

Referring to FIGS. 6B and 6C, the manner of assembly of spherical joint 58 may be understood. FIG. 6B indicates schematically the orientation of bell crank 60 and push rod 56 just before spherical joint 58 is assembled. Bosses 118 and 120 are aligned with radial slots 136 and 138 as indicated and yoke 122 is moved over the end of arm 34 so that bosses 118 and 120 enter counterbores 132 and 134 through slots 136, 138. At this time as shown in FIG. 6C, push rod 56 is rotated about the end of arm 34 so that spherical surface 144 mates with spherical surface 114 to complete spherical joint 58. Thus, slots 136, 138 are oriented at an angle to bosses 118, 120 so that joint 58 cannot come uncoupled without rotating yoke 122 back to the position shown in FIG. 6B. Due to the clearance between flat surfaces 140 and 142, push rod 56 is enabled to move about the center of curvature of surfaces 144 and 114 to provide the necessary flexibility for joint 58.

Figure 7:
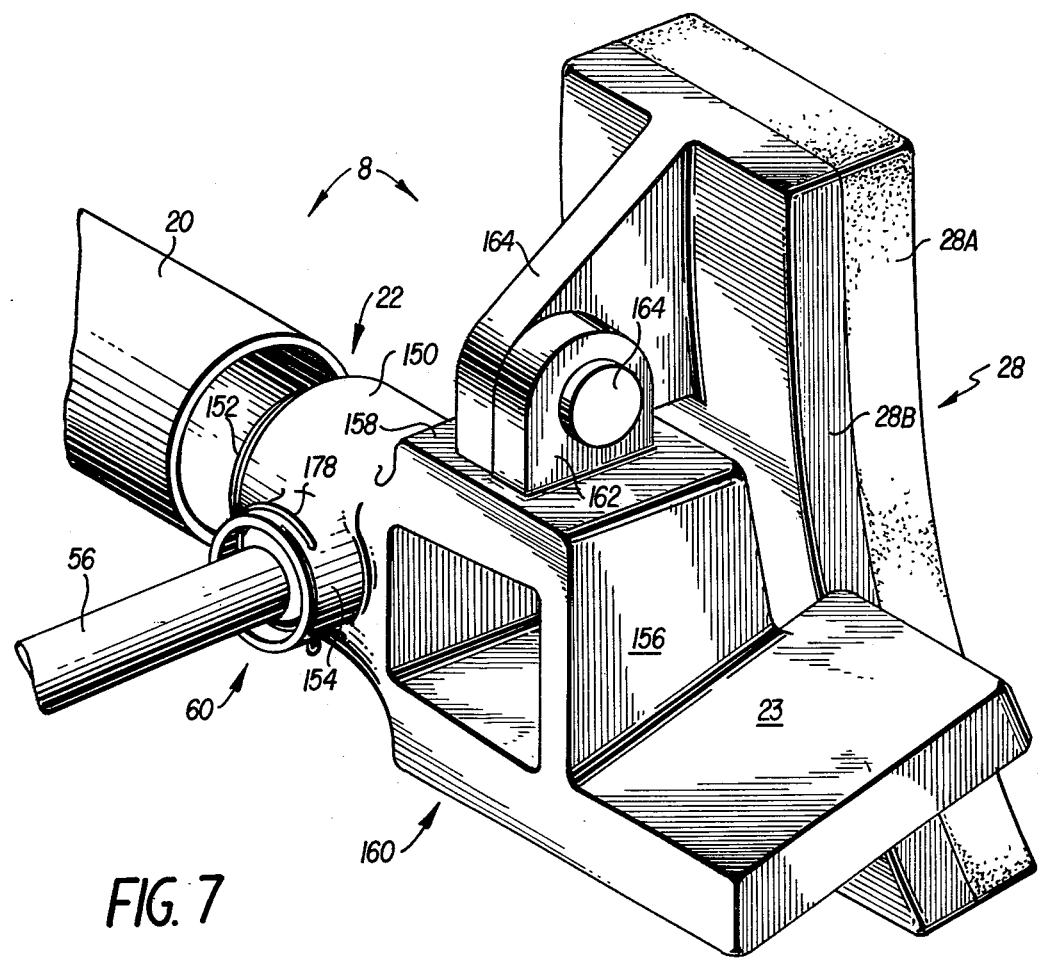
FIG. 7 shows a perspective view of one end of the secondary brake beam according to the invention indicating a portion of the geometry of the spherical joint connecting the push rod to the brake head.

FIG. 7 shows a perspective view of secondary beam brake head 22 and push rod joint 60. Break head 22 comprises a unitary steel casting having a circular cylindrical inboard end portion 150 which includes a male weld preparation 152 of the type shown in FIG. 5. Weld preparation 152 mates with central tubular section 20, in the manner previously discussed. A cylindrical boss 154 protrudes from cylindrical portion 150 toward primary beam 6 in position to receive the other end of push rod 56 and form spherical joint 60, as will be discussed with respect to FIG. 8.

Cylindrical portion 150 fares into an essentially rectangular block portion 156 integral with cylindrical portion 150. Block portion 156 includes a pair of substantially planar upper and lower surfaces 158, 160 from which extend a suitably apertured upper mounting flange 162 and a similar lower mounting flange (not shown), such as shown in FIG. 4. Brake shoe 28 is identical to that shown in FIG. 4 and includes an upper 164 and lower (not shown) mounting flange similar in function to flanges 82 and 84 shown in FIG. 4. Upper 166 and lower (not shown) fasteners secure brake shoe 28 to brake head 22 in the familiar fashion.

Figure 8:
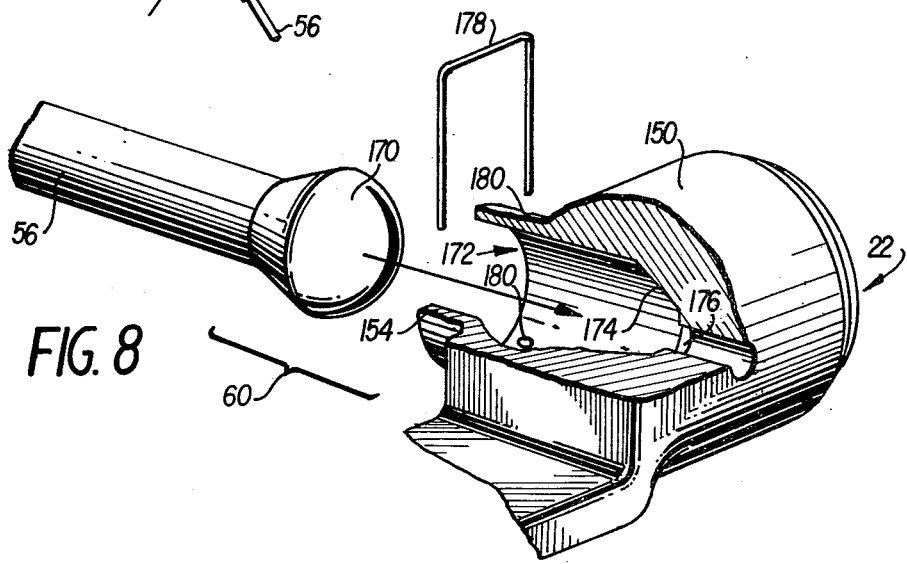
FIG. 8 shows an exploded view of the spherical joint connecting the push rod to the brake head at the secondary brake beam.

FIG. 8 shows a perspective view of spherical joint 60 which connects push rod 56 to brake head 22. Push rod 56 includes at its secondary beam end a spherical portion 170 of approximately 60° included angle. Boss 154 extends from cylindrical portion 150 of brake head 22 and surrounds a bore 172 slightly larger in diameter than spherical portion 170. Bore 172 terminates in a spherical surface 174 and includes an essentially concentric bore 176 for attachment of a lubrication fitting (not shown). A U-shaped keeper 178 passes through axially aligned holes 180 located on chords of the circumference of boss 154 (only one pair shown) to lock spherical portion 170 within bore 172 and thereby form spherical joint 60. Keeper 178 is narrower across its legs than the maximum width of portion 170.

To assemble the apparatus shown in FIGS. 1-7 in a conventional rail car, master and secondary beams 6 and 8 are first installed in the side frame members 12 and 14. Before brake cylinder 38 and slack adjustor 40 are attached to bell cranks 30, the bell cranks are rotated toward the center of the bolster 10 to expose the end of crank arm 34. At this time, yoke 122 of push rod 56 is assembled to crank arm 34 to establish spherical joint 58 and the bell cranks 30 are rotated in the opposite direction. Push rods 56 are then screwed into yokes 122 and spherical portions 170 are inserted within bores 172. Keepers 178 are then inserted and locked in place to complete the assembly of the beams and push rods. At this time, the brake cylinder and slack adjustor assembly is attached to the arms 32 of bell cranks 30 as indicated in FIGS. 1 and 2 and the handbrake cable 46 is attached.

Figure 9:
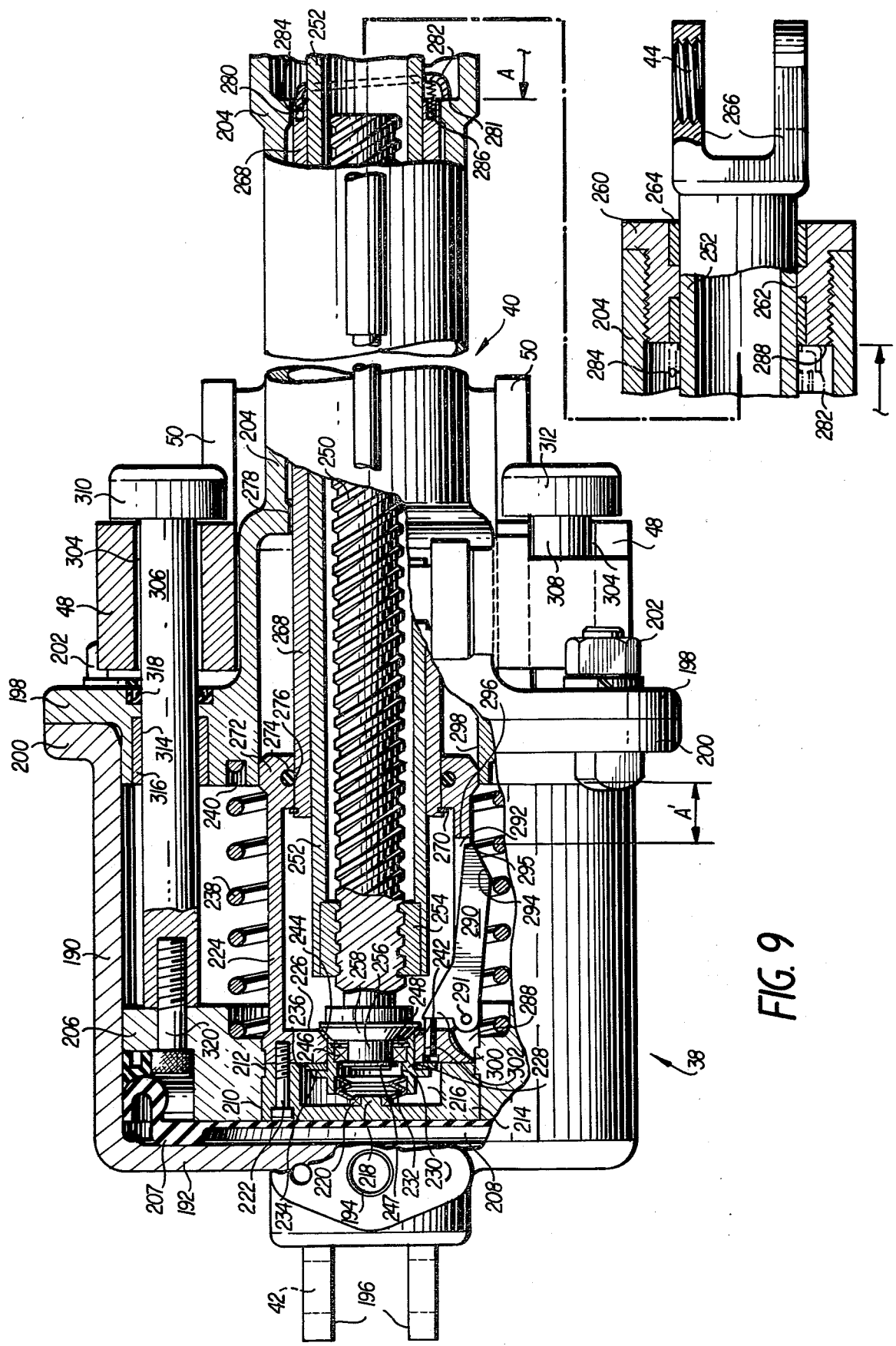
FIG. 9 shows an elevation view, partially in section, of the brake cylinder and slack adjustor according to the invention.

FIG. 9 shows an elevation view, partially in section, of the brake cylinder 38 and slack adjustor 40 used in the brake apparatus according to the invention. A cylinder housing 190 includes an end wall 192 formed integrally with cylindrical sidewalls. End wall 192 includes a pressurized air inlet port 194 leading to the interior of housing 190 and a pair of axially extending flanges 196 which form part of pivot joint 42, when the apparatus is assembled. Housing 190 is closed by end cap 198 which is secured to a radial flange 200 formed integrally with housing 190 by a plurality of bolts or fasteners 202. End cap 198 includes a hollow, elongated housing extension 204, the interior of which communicates with the interior of housing 190, as indicated. Slidably mounted within housing 190 is a piston 206 having a rubber packing cup 207 affixed to the side thereof adjacent end wall 192. A pressure chamber 208 is defined between end wall 192 and piston 206.

A central bore 210 through piston 206 includes a radially inwardly extending mounting flange 212. Located in bore 210 on the end thereof adjacent packing cup 207 is a circular thrust plate 214 which rests on one side of flange 212. A counter bore 216 in thrust plate 214 includes on its bottom surface a centrally located boss 218 on which a thrust bearing 220 is mounted. Thrust plate 214 also includes a plurality of circumferentially located throughbores for a plurality of fasteners 222 which secure an elongated stop tube retraction cylinder 224 to the other side of flange 212 and to thrust plate 214.

Retraction cylinder 224 includes a radially inwardly extending flange 226 having a central bore therethrough which slidably receives a cylindrical bronze bushing 228, which is coaxial with bearing 220. Bushing 228 includes a central bore having a radially inwardly extending flange 230. Mounted between flange 230 and thrust bearing 220 are a plurality of belleville springs 232 which are biased at assembly to urge bushing 128 away from thrust plate 214. Bushing 228 also includes a radially outwardly extending flange 234 which bears upon a hardened thrust washer 236 surrounding bushing 228 and resting on flange 226 of retraction cylinder 224. Piston 206 is normally biased to the left as indicated in FIG. 9 by a return spring 238 which bears on the side of piston 206 opposite packing cup 207 and on a groove 240 located in end cap 198. Belleville springs 232 are much stiffer than spring 238 to prevent disengagement of flange 234 and hardened thrust washer 236 under all but the highest loadings, as will be discussed.

The right end of bronze bushing 228 as seen in FIG. 9 and the bore of flange 226 are chamfered inwardly at 242 and 244, respectively. When flange 234 is in contact with hardened washer 236 and the latter is in contact with flange 226, chamfered end 242 of bronze bushing 228 extends a short distance beyond the chamfered bore 244 of flange 226. A bearing 246 is mounted on the side of flange 230 opposite belleville springs 232 and is secured within bronze bushing 228 by a snap ring 248.

Mounted for rotation within and axial movement through bearing 244 is a non-self locking lead screw 250, also mounted for rotation into, out of, or axial translation with a hollow push rod 252. A high lead nut 254 is mounted within push rod 252 and threadingly supports lead screw 248 within push rod 252. At its left end, lead screw 250 includes a short, cylindrical stub or boss portion 256 adapted for rotating and/or sliding movement in bearing 246. Stub portion 256 includes a snap ring 247 at its end to limit the sliding axial movement of lead screw 250 through bearing 244. A chamfered flange or conical head 258 extends radially from lead screw 250 adjacent boss 256 in position to sequentially contact chamfered end 242 and chamfered bore 244 during operation of the device, as will be discussed subsequently.

An end cap 260, threadingly mounted in the right end of housing extension 204, includes a central bore 262 for slidingly receiving push rod 252. Packing 264 prevents entry of dirt and other contaminates into the housing. The outboard end of push rod 252 includes a pair of axially extending flanges 266 which comprise a portion of pivot point 44.

Surrounding push rod 252 is a stop tube 268 which includes a snap ring 270 mounted in a groove at the left end thereof, as viewed in FIG. 9. Retraction cylinder 224 includes in its right end an inwardly directed flange 272 having a circumferential groove 274 on the inner diameter thereof. Located in groove 274 and captured between retraction cylinder 224 and stop tube 268 is a bronze friction ring 276, which has a slight interference fit with stop tube 268. The left end of flange 272 is prevented from moving past the end of stop tube 268 by snap ring 270.

Stop tube 268 is guided in its movement by a pair of inwardly directed, circumferential flanges 278, 280 integral with housing extension 204. At the right end of stop tube 268, a ring 282 is pivoted on a hinge 284 affixed to stop tube 268. Ring 282 is biased into the illustrated canted position by a spring 286 mounted diametrically opposite hinge 284. Contact between ring 284 and flange 280 also serves to cant ring 282 to the illustrated position. The inner diameter of ring 282 is chosen so that when the ring is canted as shown, contact between ring 282 and push rod 252 prevents push rod 252 from moving further to the left into the housing, yet allows push rod 252 to continue moving to the right if necessary.

The inner end 288 of end cap 260 is spaced from the outer end 281 of flange 280 by a distance A which is chosen to be equal to the desired clearance between brake shoes 28 and the rail car wheels. In practice, the desired clearance may vary; however, about three-quarters of an inch is adequate in most cases. During brake application, stop tube 268 will be pushed to the right due to friction between ring 276 and retraction cylinder 224 until ring 282 contacts inner end 288 as illustrated in phantom. If necessary to establish contact between brake shoes 28 and the rail car wheels, push rod 252 may continue to move outward through end cap 260, since ring 282 is ineffective to prevent such movement. When the brakes are released, push rod 252 will be forced back into housing extension 204 as brake shoes 28 withdraw from the rail car wheels due to the effects of gravity, thereby forcing bell cranks 30 to rotate in the opposite direction. As piston 206 withdraws under the influence of spring 238, stop tube 268 will move to the left until ring 282 contacts flange 280, thereby stopping movement of stop tube 268 and locking push rod 252 from further retraction into housing extension 204.

To facilitate slack adjustment due to wear of the brake shoes or rail car wheels or to replacement of the brake shoes or rail car wheels, means are provided for preventing rotation of lead screw 250 into push rod 252 once piston 206 has moved a pre-selected distance during brake application. To this end, flange 226 includes a depending pivot flange 288 on which is pivotably mounted an elongated clutch release finger 290 which moves about pivot 291 within a slot 292 located in the wall of retraction cylinder 224. At a distance from pivot 291, finger 290 includes a camming surface 294. When piston 206 is in the fully withdrawn position as illustrated, the leading edge 295 of camming surface 294 is spaced a distance A' from the lead-in edge 296 of bore 298 of housing extension 204. Distance A' is approximately equal to distance A, previously mentioned, and to the desired brake shoe to wheel clearance. Retraction cylinder 224 rides within bore 298. Radially extending from pivot 291 is a finger 300 which contacts one end of a plunger 302 slidably mounted in a bore in flange 226. The opposite end of plunger 302 abuts the under surface of hardened washer 236. The function of clutch release finger 290 will be discussed subsequently.

With reference to FIGS. 1 and 9, the structure of the emergency or handbrake application system of the invention may be understood. Crank arms 48, pivoted at points 50, include bores 304 which slidably receive a pair of diametrically spaced brake application rods 306, 308 having load transferring head flanges 310, 312 on the outer ends thereof. Rods 306, 308 are slidably received in bores 314 located in end cap 198. Bores 314 include a bushing 316 for guiding the movement of rods 306, 308 and a seal 318. Finally, screws 320 rigidly attach rods 306, 308 to the right hand surface of piston 306, as indicated.

In operation, the brake actuator according to the invention converts pneumatic pressure to mechanical pressure at the brake shoes, while simultaneously adjusting the position of its elements to provide the correct brake shoe to rail car wheel clearance after brake release. Considering first the application of the brakes in a system where shoe clearances are correct prior to brake application, air under pressure is introduced through port 294 into chamber 208, which forces piston 206 to the right as illustrated in FIG. 9. Piston 206 compresses return spring 238 and, due to the frictional engagement between friction ring 276 and retraction stop tube 268, carries retraction stop tube 268 to the right until canted ring 282, affixed to retraction stop tube 268 as previously discussed, abuts inner end 288 of end cap 260, as indicated in phantom. Simultaneously with the movement of piston 206, brake actuating force is transmitted through boss 218 of thrust plate 214, thrust bearing 220, belleville washers 232, bronze bushing 228, conical head 258 of lead screw 250 and lead nut 254 to cause push rod 252 to move to the right and apply the brakes. As brake application is achieved in the case where initial shoe clearance was correct, clutch release finger 290 has just entered bore 298 in housing extension 204. Further motion of piston 206 to the right is accompanied only by forcing the brake shoes 228 harder against the wheels. When the pressure in chamber 208 is vented to achieve a brake release, return spring 238 forces piston 206 to the left to its illustrated position, while the brake shoes withdraw under the force of gravity. As piston 206 moves leftward, the frictional engagement between stop tube 268 and friction ring 276 pulls stop tube 268 back to its illustrated position, where the canted ring 282 locks push rod 252 and stop tube 268 from further leftward movement, thereby preserving the correct brake shoe clearance.

Suppose, now, that the rail car wheels have been replaced with new wheels having larger diameters. The effect of such a change is to reduce the brake shoe clearance at all wheels. If the brakes are now applied, push rod 252 will stop its rightward movement at an earlier time due to the reduced clearance. When this happens, the pressure in chamber 208 will cause piston 206 to compress belleville springs 232, when chamfered end 242 of bronze bushing 228 is pressed against conical head 258 of lead screw 250. This tends to reduce the axial force causing flange 234 of bronze bushing 228 to be held against hardened washer 236, thereby reducing the frictional force which prevents rotation of bronze bushing 228, belleville springs 232, bearing 220 and lead screw 250. When the frictional force has been sufficiently reduced, lead screw 250 will rotate into lead nut 254 allowing piston 206 and stop tube 268 to continue to move to the right. Although belleville springs 232 are compressed, the full braking force is still transferred from piston 206 to lead screw 250.

As finger 290 enters bore 298 in housing extension 204, it rotates on pivot 291 due to the camming action of bore 298 and cam surface 294 of finger 290. This presses plunger 302 to the left. Movement of plunger 302 lifts hardened washer 236 completely away from flange 226, thereby pulling chamfered clutch surface 242 of bronze bushing 228 out of contact with conical head 258 of lead screw 250. The lead screw 250 thus comes into frictional contact with chamfered bore or clutch surface 242 of flange 226 and is prevented from further rotation. At this point, the slack of the actuator has been reduced as necessary and further pressure increases in chamber 208 will only result in forcing the brake shoes harder against the wheels. When chamber 208 is vented to release the brakes, the parts return to their illustrated position, just as in the case where the initial clearance was correct.

Finally, consider the instance where the initial shoe clearance is larger than desired. As chamber 208 is pressurized, piston 206 will move to the right carrying stop tube 268, until finger 290 enters bore 298 in housing extension 204. Actuation of finger 290 permits conical head 258 of lead screw 250 to move into frictional engagement with clutch surface 244 of flange 226, thereby preventing rotation of lead screw 250. So, piston 206 and push rod 252 continue to move to the right until the excess clearance has been travelled and brake shoe contact has been established at the wheels. Further increases in the pressure in chamber 208 will result in forcing the brake shoes harder against the wheels.

When chamber 208 is vented, return spring 238 forces piston 206 to the left, drawing along stop tube 268 in the manner previously described, until canted ring 282 locks push rod 252 and stop tube 268 from further leftward movement. As previously discussed, push rod 252 retracts due to the forces of gravity. At this point, piston 206 will not yet have completed its movement in the brake releasing direction. Since stop tube 268 and push rod 252 can no longer move, release spring 238 will force piston 206 to the left. As piston 206 continues its leftward movement, the frictional force between friction ring 276 and stop tube 268 is overcome. Simultaneously, conical head 258 of lead screw 250 loses contact with one of clutch surfaces 242 or 244, whichever is then engaging it, and lead screw 250 is pulled leftward while rotating in lead nut 254 by flange 226, hardened washer 236, bronze bushing 228, snap ring 248, thrust bearing 246 and snap ring 247, until piston 206 reaches its illustrated position. Thus, the appropriate amount of extra length is provided in the actuator to adjust it for increases in brake shoe clearance so that the brakes will have the correct clearance for the following brake application.

Having described our invention in sufficient detail to enable those skilled in the art to make and use it, we claim:

1. A brake rigging for a four-wheel type of vehicle truck having a transverse axis, a longitudinal axis perpendicular thereto, and a bolster so disposed that its axis coincides with the transverse axis of the truck, said brake rigging including two brake beams extending in spaced, substantially parallel relation to the transverse axis of the truck and guidably supported on the truck for bodily movement longitudinally of the truck, wherein the improvement comprises:
   a first brake beam having a first tubular central section;
   a first pair of brake shoe carrying heads, one of said first pair mounted on each end of said first tubular central portion, each of said first pair of brake shoe carrying heads including pivot means formed therewith;
   a second brake beam having a second tubular central section;
   a second pair of brake shoe carrying heads, one of said second pair mounted on each end of said second tubular central portion, each of said second pair of brake shoe carrying heads including means formed therewith for transmitting braking force to the wheels on its side of said truck;
   a pair of bell-crank levers each having a fulcrum and a pair of arms, one of said levers being mounted for rotation in each of said pivot means; and
   a pair of push rods, each one of the pair connected respectively at one end to one arm of one of said bell-crank levers and at the other end to one of said means for transmitting braking force.

2. A brake rigging as claimed in claim 1, wherein said brake shoe carrying heads are castings mounted to said tubular central sections by circumferential welds.

3. A brake rigging as claimed in claim 1, wherein said means for transmitting braking force are so located as to transfer force from said push rods essentially perpendicularly to said first and second brake beams, whereby bending moments and axial loadings in said second tubular central section are minimized during brake application.

4. A brake rigging as claimed in claim 3, wherein said second tubular central section is substantially smaller in crossection than said first tubular central section.

5. A brake rigging is claimed in claim 1, further comprising a fluid pressure operable brake actuator mounted between the other arms of said bell-crank levers for applying brake actuating force in opposite directions to said levers.

6. A brake rigging as claimed in claim 5, wherein said brake actuator comprises means attached to said actuator for manually operating said actuator in the event of a loss in fluid pressure.

7. A brake rigging as claimed in claim 5, wherein said brake actuator comprises:
   housing means connected to one of said other arms of said bell cranks and having a bore therethrough;
   fluid pressure operable piston means slidably mounted within said bore for alternate movement in a brake-applying direction and a brake releasing direction;
   push rod means slidably mounted within said bore and connected at one end to the other end of said other arms of said bell cranks, for transmitting force from said piston means in said brake applying direction, said push rod having an axially extending bore therein; and
   a slack adjustor comprising:
   lead screw means rotatably mounted in said axially extending bore for axial movement therein;
   means operatively connected to said piston and said push rod for preventing movement of said push rod beyond a preselected distance in said brake releasing direction in response to release of fluid pressure acting on said piston;

first means operatively connected to said piston and said lead screw for preventing rotation of said lead screw into said push rod in said brake applying direction unless said piston has moved a distance less than said preselected distance and simultaneously said push rod has transmitted a predetermined force in said brake applying direction, and thereafter for permitting rotation of said lead screw into said push rod in said brake applying direction;

second means operatively connecting said piston and said lead screw for preventing rotation of said lead screw in said brake applying direction after said piston has moved a distance equal to or greater than said preselected distance; and means attached to said piston for withdrawing said lead screw from said push rod in said brake releasing direction when said preventing means has stopped further movement of said push rod in said brake releasing direction and said piston has not completed its motion in said brake releasing direction.

8. A brake rigging as claimed in claim 7, wherein said means for withdrawing said push rod comprises:
a stop tube surrounding at least a portion of said push rod means said stop tube being mounted for axial movement in said housing and over said push rod;
a friction ring slidably received on said stop tube and retained by said piston; and
means cooperating with said stop tube and said housing for locking said push rod and said stop tube against movement when said push rod has moved said preselected distance in said brake releasing direction.

9. A brake rigging as claimed in claim 8, wherein said bore comprises a radially extending flange and said stop tube locking means comprises a ring resiliently pivoted to an end of said stop tube, said ring surrounding said push rod and being located to contact said shoulder when said stop tube has moved said preselected distance and further being sized on its interior diameter to cant into locking contact with said push rod upon contact with said shoulder.

10. A brake rigging as claimed in claim 7, wherein said first means for preventing rotation comprises:
a bushing mounted for rotation and translation in said piston, one end of said bushing being movable into contact with said lead screw for translation and/or rotation therewith;
means operatively interconnecting said bushing and said piston for controlling rotation of said bushing within said piston; and
spring means operatively connected to said piston and said rotation controlling means to prevent rotation of said bushing and lead screw until said predetermined force is transmitted through said push rod and lead screw.

11. A brake rigging as claimed in claim 7, wherein said second means for preventing rotation comprises:
a bushing mounted for translation and rotation within said piston, one end of said bushing being movable into contact with said lead screw for translation and/or rotation therewith;
spring means operatively connected to said bushing and said piston to prevent translation of said bushing within said piston;
a clutch surface in said piston surrounding said bushing in a position to be contacted by said end of said lead screw; and means operatively connected to said bushing and said piston for translating said bushing relative to said piston after said piston has moved said preselected distance whereby contact is established between said clutch surface and said lead screw to prevent rotation of said lead screw.

12. A brake rigging as claimed in claim 7, wherein said means for withdrawing said lead screw when movement of said push rod has stopped comprises:
bearing means mounted within said piston;
a boss integral with said lead screw and slidably positioned within said bearing for translation therethrough; and
means mounted on said boss for engaging said bearing means to permit rotation of said lead screw after said piston has moved said preselected distance in said brake releasing direction.

13. A brake rigging as claimed in claim 7, further comprising:
at least one auxilliary piston actuating rod attached to said piston; and
means attached to said housing for applying force to said actuating rod, whereby said piston may be moved to apply said brakes in the event of a loss in fluid pressure to actuate said piston.

14. A brake rigging according to claim 1, wherein said bell crank levers and said push rods are connected by a joint comprising:
at least one boss extending vertically from said one end of said bell crank levers, said boss being elongated in a first direction;
a yoke having a pair of arms spaced to receive said one end, said arms comprising at least one interior counterbore therein for receiving said at least one boss and at least one radially extending slot through the wall of said at least one counterbore, said slot being oriented at an angle to the direction of elongation of said boss when said joint is assembled, whereby said joint cannot come uncoupled in use.

15. A brake rigging according to claim 14, wherein said one end of said bell crank levers includes a first spherical bearing surface and said yoke includes a second spherical bearing surface between said arms for mating with said first surface when said joint is assembled.

16. A brake rigging according to claim 1, wherein said push rods comprise a spherical bearing surface at the other end thereof and said means for transmitting braking force comprises a bore in said second brake shoe carrying head having a spherical bottom surface for mating with said spherical bearing surface and means for retaining said other end within said bore.

17. A brake rigging according to claim 16, wherein said bore includes an axially extending circumferential boss having aligned holes located on chords thereof and keeper means located in said aligned holes for retaining said other end.

18. A brake rigging for a four-wheel type of vehicle truck, said rigging comprising:
a first brake beam extending transverse to the axis of said truck;
a second brake beam parallel to said first brake beam;
a pair of bell-crank levers each having a fulcrum and a pair of arms, said levers being pivotably mounted on said first brake beam at spaced locations thereon;

a pair of push rods, each one of the pair pivotably connected respectively at one end to one arm of said bell-crank levers and at the other end of said second brake beam; and a fluid pressure operable brake actuator mounted between the other arms of said bell-crank levers for applying brake actuating forces in opposite directions to said levers, said actuator including means attached to said actuator for manually expanding said actuator to apply brake actuating forces in opposite direction to said levers in the event of a loss in fluid pressure.

19. A brake rigging as claimed in claim 18, wherein said brake actuator comprises:

housing means connected to one of said other arms of said bell cranks and having a bore therethrough;

fluid pressure operable piston means slidably mounted within said bore for alternate movement in a brake-applying direction and a brake releasing direction;

push rod means slidably mounted within said bore and connected at one end to the other of said other arms of said bell cranks, for transitting force from said piston means in said brake applying direction, said push rod having an axially extending bore therein; and a slack adjustor comprising:

lead screw means rotatably mounted in said axially extending bore for axial movement therein;

means operatively connected to said piston and said push rod for preventing movement of said push rod beyond a preselected distance in said brake releasing direction in response to release of fluid pressure acting on said piston;

first means operatively connected to said piston and said lead screw for preventing rotation of said lead screw into said push rod in said brake applying direction unless said piston has moved a distance less than said preselected distance and simultaneously said push rod has transmitted a predetermined force in said brake applying direction, and thereafter for permitting rotation of said lead screw into said push rod in said brake applying direction;

second means operatively connecting said piston and said lead screw for preventing rotation of said lead screw in said brake applying direction after said piston has moved a distance equal to or greater than said preselected distance; and means attached to said piston for withdrawing said lead screw from said push rod in said brake releasing direction when said preventing means has stopped further movement of said push rod in said brake releasing direction and said piston has not completed its motion in said brake releasing direction.

20. A brake rigging as claimed in claim 19, wherein said means for withdrawing said push rod comprises:

a stop tube surrounding at least a portion of said push rod means said stop tube being mounted for axial movement in said housing and over said push rod;

a friction ring slidably received on said stop tube and retained by said piston; and means cooperating with said stop tube and said housing for locking said push rod and said stop tube against movement when said push rod has moved said preselected distance in said brake releasing direction.

21. A brake rigging as claimed in claim 20, wherein said bore comprises a radially extending flange and said stop tube locking means comprises a ring resiliently pivoted to an end of said stop tube, said ring surrounding said push rod and being located to contact said shoulder when said stop tube has moved said preselected distance and further being sized on its interior diameter to cant into locking contact with said push rod upon contact with said shoulder.

22. A brake rigging as claimed in claim 19, wherein said first means for preventing rotation comprises:

a bushing mounted for rotation and translation in said piston, one end of said bushing being movable into contact with said lead screw for translation and/or rotation therewith;

means operatively interconnecting said bushing and said piston for controlling rotation of said bushing within said piston; and spring means operatively connected to said piston and said rotation controlling means to prevent rotation of said bushing and lead screw until said predetermined force is transmitted through said push rod and lead screw.

23. A brake rigging as claimed in claim 19, wherein said second means for preventing rotation comprises:

a bushing mounted for translation and rotation within said piston, one end of said bushing being movable into contact with said lead screw for translation and/or rotation therewith;

spring means operatively connected to said bushing and said piston to prevent translation of said bushing within said piston;

a clutch surface in said piston surrounding said bushing in a position to be contacted by said end of said lead screw; and means operatively connected to said bushing and said piston for translating said bushing relative to said piston after said piston has moved said preselected distance whereby contact is established between said clutch surface and said lead screw to prevent rotation of said lead screw.

24. A brake rigging as claimed in claim 19, wherein said means for withdrawing said lead screw when movement of said push rod has stopped comprises:

bearing means mounted within said piston;

a boss integral with said lead screw and slidably positioned within said bearing for translation therethrough; and means mounted on said boss for engaging said bearing means to permit rotation of said lead screw after said piston has moved said preselected distance in said brake releasing direction.

25. A brake rigging as claimed in claim 18, wherein said actuator comprises a housing with a movable piston therein and said means for manually operating comprises:

at least one auxiliary piston actuating rod attached to said piston; and means attached to said housing for applying force to said actuating rod, whereby said piston may be moved to apply said brakes in the event of a loss in fluid pressure to actuate said piston.

26. A brake rigging according to claim 18, wherein said bell crank levers and said push rods are connected by a joint comprising:

at least one boss extending vertically from said one end of said bell crank levers, said boss being elongated in a first direction;

a yoke having a pair of arms spaced to receive said one end, said arms comprising at least one interior counterbore therein for receiving said at least one boss and at least one radially extending slot through the wall of said at least one counterbore, said slot being oriented at an angle to the direction of elongation of said boss when said joint is assembled, whereby said joint cannot come uncoupled in use.

27. A brake rigging according to claim 26, wherein said one end of said bell crank levers includes a first spherical bearing surface and said yoke includes a second spherical bearing surface between said arms for mating with said first surface when said joint is assembled.

28. A brake rigging according to claim 18, wherein said push rods comprise a spherical bearing surface at the other end thereof and said means for transmitting braking force comprises a bore in said second brake shoe carrying head having a spherical bottom surface for mating with said spherical bearing surface and means for retaining said other end within said bore.

29. A brake rigging according to claim 18, wherein said bore includes an axially extending circumferential boss having aligned holes located on chords thereof and keeper means located in said aligned holes for retaining

* * * * *